United States Patent [19]
McCormick

[11] 3,900,922
[45] Aug. 26, 1975

[54] CABLE TIES

[75] Inventor: Matthew McCormick, Manchester, England

[73] Assignee: Bowthorpe Hellermann Limited, Sussex, England

[22] Filed: Aug. 30, 1974

[21] Appl. No.: 502,012

[30] Foreign Application Priority Data
Aug. 31, 1973 United Kingdom............... 41190/73

[52] U.S. Cl............................................. 24/16 PB
[51] Int. Cl.²........................................ B65D 63/00
[58] Field of Search.......... 24/16 PB, 73 PB, 206 A, 24/17 AP, 30.5 P; 248/74 PB

[56] References Cited
UNITED STATES PATENTS

| | | | |
|---|---|---|---|
| 3,149,808 | 9/1964 | Weckesser | 248/74 PB |
| 3,197,829 | 8/1965 | Caveney et al. | 24/16 PB |
| 3,258,819 | 7/1966 | Weckesser | 24/16 PB |
| 3,300,825 | 1/1967 | Andreasen | 24/16 PB |
| 3,486,201 | 12/1969 | Bourne | 24/16 PB |

FOREIGN PATENTS OR APPLICATIONS

| | | | |
|---|---|---|---|
| 209,500 | 8/1957 | Australia | 248/74 PB |
| 1,447,628 | 6/1966 | France | 24/16 PB |

*Primary Examiner*—Donald A. Griffin
*Attorney, Agent, or Firm*—Brisebois & Kruger

[57] ABSTRACT

A one-piece tie of plastics material for tying around a bundle of cables and the like comprises a flexible strap having transverse serrations on one side for locking with transverse teeth under the influence of a wedging portion which is formed on the strap between the serrated portion thereof and an apertured head at one end of the strap. Firstly the free end of the strap is drawn completely through the aperture to place the wedge portion within the aperture with a portion of the surface of the strap opposite the wedge portion resting on an inclined surface formed on the end wall of the head adjacent the strap. Then the strap is looped around a bundle and passed back through the head for the strap serrations to ride past the transverse locking teeth, these teeth preventing subsequent withdrawal of the strap and any tension in the strap in the withdrawal direction then serving to draw the wedge portion over the inclined surface to wedge the strap against an opposite end wall of the head. The transverse teeth are provided in one embodiment on the wedge portion and in another embodiment on the opposite end wall of the head, the serrations being provided in each case on the appropriate side of the strap.

2 Claims, 5 Drawing Figures

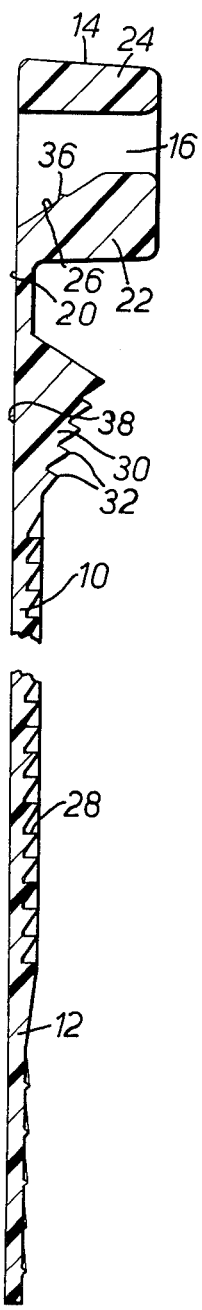
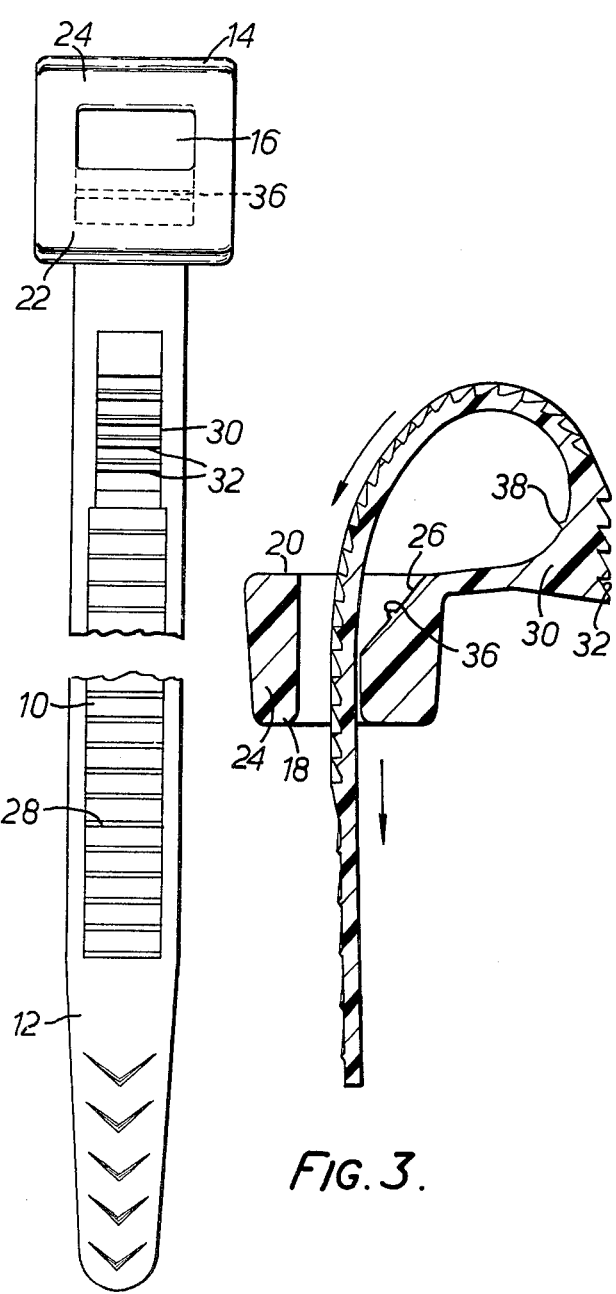
FIG.1.  FIG.2.  FIG.3.

CABLE TIES

BACKGROUND AND OBJECT OF THE INVENTION

The present invention relates to a one-piece tie of plastics material for tying around a bundle of cables or the like.

U.S. Pat. No. 3,127,648 to Emery was the forerunner of ties comprising a flexible strap having serrations on one surface for locking with transverse teeth formed on a pivoted pawl when a free end of the strap is passed through an apertured head which is at the other end of the strap and which contains the pawl, wherein any tension applied to the strap tending to withdraw it from the aperture acts to pivot the pawl so as more firmly to grip the strap against an abutment surface opposite the pawl. This type of tie has been extremely successful and efforts have been made to improve the strength of the tie, in other words to increase the amount of back-tension in the strap which can be accommodated without the interlock failing between the pawl and strap serrations. However, the success of these efforts has been somewhat limited and it has not been possible to design a tie wherein the interlock between the pawl and strap serrations will not ultimately fail on account of the pawl being pivoted through a large angle under the tension of the strap and therefore being severed from its hinge and drawn out of the aperture.

It is therefore an object to provide a one-piece tie which is able to withstand higher tensions in the strap when tied.

SUMMARY OF THE INVENTION

The present invention provides a one-piece tie of plastics material comprising a flexible elongate strap, a head at one end of the strap formed with an aperture extending therethrough for receiving the other end of the strap, an inclined surface formed within said aperture on an end wall of said head which is adjacent a junction of said strap and said head, said inclined surface being adjacent one end of said aperture and inclining away from an opposite end wall of said head towards said one end of said aperture, a series of transverse ratchet serrations formed on said strap on one side thereof, a wedge portion formed on the side of said strap which faces said other end of said aperture and disposed between said head and the portion of said strap having said series of serrations, said wedge portion being arranged so that threading said other end of the strap through said aperture from said one end thereof places said wedge portion in said aperture with a portion of the surface of the side of said strap opposite said wedge portion resting upon said inclined surface and with an opposite surface of the wedge portion facing said opposite end wall of the head, there being provided at least one transverse tooth profiled complementarily to the serrations and arranged to enable the strap to be looped subsequently and passed back through said aperture from said other end thereof with the strap serrations running past said tooth, whereafter engagement between said tooth and serrations prevents the strap being drawn over said tooth in the opposite direction and any tension applied to said strap in said opposite direction serves to draw the wedge portion in said opposite direction over the inclined surface to more firmly grip the strap against said opposite end wall of the head.

Preferably, the inclined surface in the aperture and the portion of the surface on the side of the strap opposite the wedge portion are provided with transverse abutments which engage to limit slippage of the wedge portion over the inclined surface as increasing tension is applied to the strap in the strap-loosening direction, i.e. in said "opposite direction".

In one embodiment to be described, the tooth for engaging said serrations is disposed on said opposite surface of the wedge portion and said serrations are provided on said side of said strap which faces said other end of said aperture.

In another embodiment, the tooth for engaging said serrations is disposed in said aperture on said opposite end wall of the head and said serrations are provided on the side of said strap which faces said one end of said aperture.

Embodiments of the invention will now be described by way of examples only with reference to the accompanying drawings, in which:

FIG. 1 is a longitudinal section through one tie;

FIG. 2 is a plan view of the tie of FIG. 1;

FIG. 3 is a longitudinal section through the tie of FIGS. 1 and 2 shown in an intermediate stage of preparation for looping around a bundle of cables;

Figure 4:
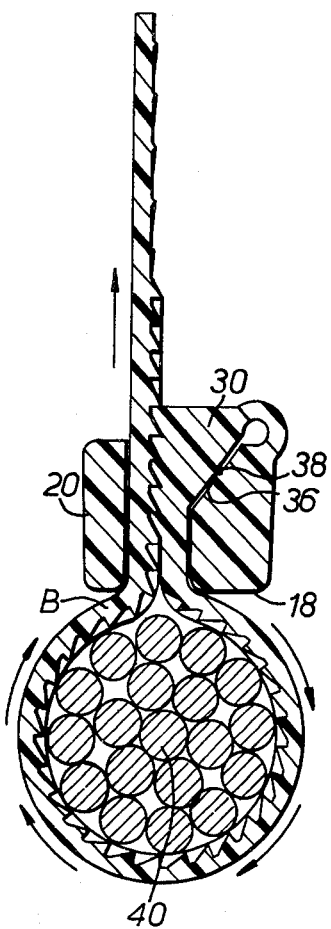
FIG. 4 is a longitudinal section through the tie when tied around a bundle of cables.

Referring to FIGS. 1 and 2 of the drawings, there is shown a one-piece tie 10 of plastics material comprising a flexible elongate strap 12 provided at one end with a head 14 having an aperture 16 extending therethrough from an entry surface 18 to an exit surface 20 of the head. The head 14 has one end wall 22 adjacent the junction between head and strap and an opposite end wall 24. The one end wall 22 is provided with an inclined surface 26 being inclined to the direction of the aperture and inclining away from the opposite end wall towards the exit surface.

The strap 12 is provided on one side thereof, facing the entry surface of the head, with a series of transverse ratchet serrations 28 and with a wedge portion 30 disposed between the head and the portion of strap having the serrations. The wedge portion 30 is provided with a series of transverse teeth 32 in a common plane inclined to the plane of the strap. Conveniently, as shown, the length of strap between the wedge portion and the head may be thinner than the remaining length of strap.

Finally, the inclined surface 26 in the head and the portion of strap surface opposite the wedge portion (and on the other side of the strap from the serrations) are provided with respective abutments 36, 38 for a purpose to be described hereinafter.

Before the tie can be tied around a bundle of cables or the like, it must be prepared in the manner shown in FIG. 3. Thus, the free end of the strap is threaded through the aperture from the exit surface 20 and this operation places the wedge portion 30 in the aperture, as shown in FIG. 4, with the portion of strap surface opposite the wedge portion resting upon the inclined surface 26 and with the teeth 32 lying opposite the end wall 24 and on a plane parallel to that end wall. The tie is then ready for tying around a bundle of cables.

Tying is effected as shown in FIG. 4 by looping the strap around a bundle 40 of cables and then passing the strap back through the aperture from the entry surface 18 of the head. The teeth 32 on the wedge portion and the serrations on the strap are complementarily profiled and enable the strap serrations to ride past the teeth 32 as the tie is tightened around the bundle 40 of cables and tensioned. Once the tensioning force is released, back-tension in the strap causes the wedge portion 30 to move slightly in the strap-loosening direction, until the teeth 32 engage the strap serrations for the wedge portion to firmly grip the strap against the opposite end wall 24 of the head. As the back-tension operates, the wedge portion is drawn down the inclined surface 26 in a wedging manner to firmly grip the strap against the end wall 20. Under exceptional back-tension the transverse abutments 36 and 38 meet to limit slippage of the wedge portion, whereafter under any residual back-tension the strap moves the wedge portion across the aperture towards the opposite end wall 24 of the head with relative sliding movement of the abutment 36, 38, the abutting surfaces of which are perpendicular to the plane of the strap when tied through the aperture. The abutments thus serve to prevent the wedge portion being pulled back through the aperture, so to release the tie.

The relatively thin length of strap between the wedge portion and the head enables the wedge portion to move entirely under the influence of the back-tension in the strap and the relative sliding and wedging engagement, without being restricted by such length of strap.

Figure 5:
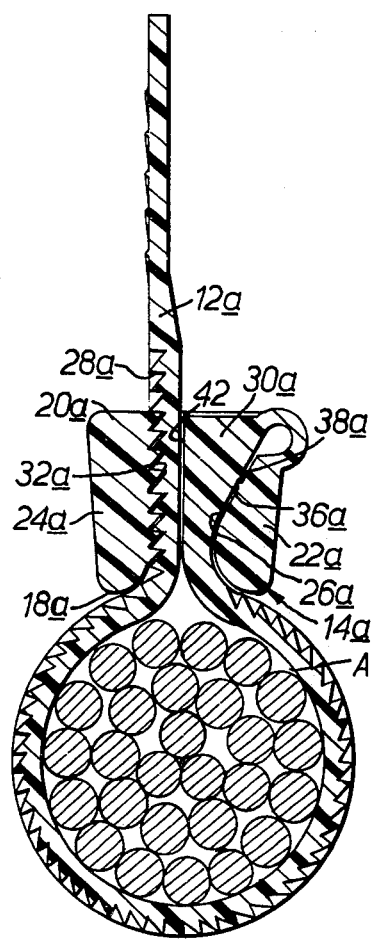
FIG. 5 is a section similar to that of FIG. 4 through a second tie.

Referring now to FIG. 5 of the drawings, there is shown a second embodiment of tie tied around a bundle of cables. Like parts between the tie of FIG. 5 and the tie of FIGS. 1 to 4 are identified by like reference numerals, provided in FIG. 5 with the suffix *a*. In the tie shown in FIG. 5, the ratchet serrations are provided on the side of the strap which faces the exit surface 20*a* of the head (in the as-moulded condition), while a series of teeth 32*a* is provided on the outer end wall 24*a* of the head, the wedge portion having a plane surface 42 which is inclined to the plane of the strap (the strap is flat in the as-moulded condition, just as for the tie of FIGS. 1 to 4) at such an angle that, as shown, it lies parallel to the opposite end wall of the head in the tied condition. The mode of preparing and tying the tie of FIG. 5 is precisely the same as for the tie of FIGS. 1 to 4, except that it will be noted that back-tension in the strap will act on the right-hand portion A of the loop to draw the wedge portion down, instead of on the left-hand portion B (see FIG. 4) and through the engaged teeth 32 and serrations 28.

The ties which have been described are particularly suited to heavy duty applications.

What I claim is:

1. A one-piece tie of plastics material comprising a flexible elongate strap, a head at one end of the strap formed with an aperture extending therethrough for receiving the other end of the strap, an inclined surface formed within said aperture on an end wall of said head which is adjacent a junction of said strap and said head, said inclined surface being adjacent one end of said aperture and inclining away from an opposite end wall of said head towards said one end of said aperture, a series of transverse ratchet serrations formed on said strap on one side thereof, a wedge portion formed on the side of said strap which faces said other end of said aperture and disposed between said head and the portion of said strap having said series of serrations, said wedge portion being arranged so that threading said other end of the strap through said aperture from said one end thereof places said wedge portion in said aperture with a portion of the surface of the side of said strap opposite said wedge portion resting upon said inclined surface and with an opposite surface of the wedge portion facing said opposite end wall of the head, there being provided at least one transverse tooth profiled complementarily to the serrations and arranged to enable the strap to be looped subsequently and passed back through said aperture from said other end thereof with the strap serrations running past said tooth, whereafter engagement between said tooth and serrations prevents the strap being drawn over said tooth in the opposite direction and any tension applied to said strap in said opposite direction serves to draw the wedge portion in said opposite direction over the inclined surface to more firmly grip the strap against said opposite end wall of the head, and a transverse abutment formed on each said inclined surface in said aperture and said portion of the surface of said side of said strap opposite said wedge portion to engage to limit slippage of the wedge portion over said inclined surface as increasing tension is applied to said strap in said opposite direction.

2. A one-piece tie as claimed in claim 1, in which said transverse abutments are provided with mutually engaging surfaces which are perpendicular to the aperture when the tie is tied.

* * * * *